US009003551B2

(12) United States Patent
Hoyer

(10) Patent No.: US 9,003,551 B2
(45) Date of Patent: Apr. 7, 2015

(54) SYSTEM AND METHOD FOR OBSCURING DISPLAYED INFORMATION

(71) Applicant: Timo Hoyer, Mountain View, CA (US)

(72) Inventor: Timo Hoyer, Mountain View, CA (US)

(73) Assignee: SAP SE, Walldorf (DE)

( * ) Notice: Subject to any disclaimer, the term of this patent is extended or adjusted under 35 U.S.C. 154(b) by 36 days.

(21) Appl. No.: 13/792,738

(22) Filed: Mar. 11, 2013

(65) Prior Publication Data

US 2014/0259184 A1 Sep. 11, 2014

(51) Int. Cl.
H04L 29/06 (2006.01)
H04L 9/32 (2006.01)
G06F 21/62 (2013.01)

(52) U.S. Cl.
CPC .................... G06F 21/6245 (2013.01)

(58) Field of Classification Search
CPC ...... G06F 3/04883; G06F 3/017; G06F 3/044; G06F 21/32; G06F 21/84; G06F 21/6245; G06F 21/31
USPC .......................................................... 726/19
See application file for complete search history.

(56) References Cited

U.S. PATENT DOCUMENTS

| | | | |
|---|---|---|---|
| 5,835,919 A | 11/1998 | Stern et al. | |
| 6,529,209 B1 * | 3/2003 | Dunn et al. | 345/629 |
| 6,597,328 B1 * | 7/2003 | Stern et al. | 345/9 |
| 7,574,659 B2 | 8/2009 | Szabo | |
| 7,650,641 B2 * | 1/2010 | Veselova et al. | 726/26 |
| 8,601,395 B2 | 12/2013 | Wong et al. | |
| 8,614,684 B2 * | 12/2013 | Chang | 345/173 |
| 8,631,018 B2 | 1/2014 | Ramer et al. | |
| 8,726,198 B2 | 5/2014 | Rydenhag et al. | |
| 2004/0193910 A1 * | 9/2004 | Moles | 713/200 |
| 2006/0026535 A1 | 2/2006 | Hotelling et al. | |
| 2008/0282170 A1 | 11/2008 | Arend et al. | |
| 2009/0138402 A1 * | 5/2009 | Chan et al. | 705/51 |
| 2010/0328253 A1 * | 12/2010 | Paulsen et al. | 345/174 |
| 2011/0283188 A1 | 11/2011 | Farrenkopf et al. | |
| 2012/0113015 A1 | 5/2012 | Werner | |
| 2012/0132746 A1 | 5/2012 | Sizelove | |
| 2012/0167015 A1 | 6/2012 | Martick | |
| 2013/0149964 A1 * | 6/2013 | Kreiner | 455/41.2 |
| 2013/0185803 A1 * | 7/2013 | Travis et al. | 726/26 |
| 2013/0307870 A1 * | 11/2013 | Ashbrook | 345/629 |
| 2014/0016151 A1 | 1/2014 | Malik | |
| 2014/0028589 A1 | 1/2014 | Reilly | |
| 2014/0108974 A1 | 4/2014 | Hoyer | |
| 2014/0109010 A1 | 4/2014 | Casey et al. | |

* cited by examiner

*Primary Examiner* — Christopher Revak
(74) *Attorney, Agent, or Firm* — Schwegman Lundberg & Woessner, P.A.

(57) ABSTRACT

A method includes obtaining information from an application to display to a user of a device having a screen from which information may be viewed by more than one person, generating a cover to selectively obscure sensitive information contained in a portion of the screen displaying the information, and receiving user input to selectively invoke or remove the cover relative to sensitive information to obscure display of the sensitive information on the screen.

20 Claims, 5 Drawing Sheets

SYSTEM AND METHOD FOR OBSCURING DISPLAYED INFORMATION

BACKGROUND

During business meetings different employee or business related data are topics of discussion. For example, one part of a business meeting may involve discussion of confidential, employee specific data between human resource business partners (HRBP) and line managers for the reason of finding/defining new top talents or promoting high performers, in a tablet type of application such as a human resources type of application, the user can flick through employee profile elements—which, in that case have the look and feel of a realistic folder—very quickly to compare them on a user interface (UI) stack in a main content area on a right side of a display. In a case where two meeting participants have different access rights it can be a problem to have multiple data sheets displayed one after another without security and having the probability of revealing confidential content by accident.

For instance, if the HRBP has added two employee data sheets on the content area, and only the first employee is one of the manager's team members, while the second employee is not, the manager does not have rights to access or read the data of the second employee. However, the HRBP does not want to close this profile by tapping the x-button on the upper left of the folder because it was took some time to look up the correct employee from the navigation panel and add it to the display area. Also, the HRBP needs to have it opened in order to remember the name and organizational unit to discuss the person in general. When sitting in front of a tablet computer, or perhaps a projected image of the screen on the tablet or other type of computer, it is desired to give both participants the option to look at the displayed information, in contrast to a smart phone, which is more a personal device. The tablet computer seems to have become a small projector used for presentations/meetings with fewer participants.

Under these circumstances it can be a major problem for the HRBP to not knowing how to hide confidential content like compensation history or work experience instantly without closing the profile entirely. It could even be a reason for the client not buying the app because of legal issues that might arise using it.

SUMMARY

A method includes obtaining information from an application to display to a user of a device having a screen from which information may be viewed by more than one person, generating a cover to selectively obscure sensitive information contained in a portion of the screen displaying the information, and receiving user input to selectively invoke or remove the cover relative to sensitive information to obscure display of the sensitive information on the screen.

The method may be implemented via code stored on a computer readable storage device in a further embodiment.

A system includes a processor and a computer readable storage device coupled to provide code to the processor. An application generates information for display on a display device. The information includes sensitive information to be positioned in a selected portion of the display device. A cover module is used to generate and control a cover positioned in the selected portion of the screen to selectively obscure the sensitive information.

DETAILED DESCRIPTION in the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor. ASIC, microprocessor, or other type of processor operating on a computer system, such as a personal computer, server or other computer system.

Figure 1:
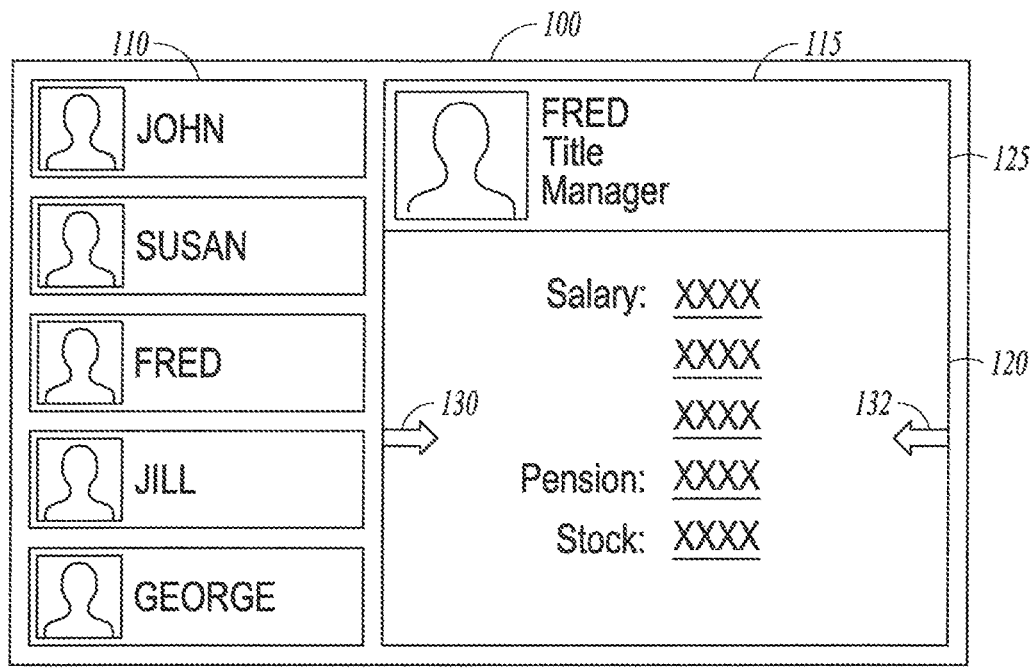
FIG. 1 is a representation of a screen displaying information containing sensitive information to be selectively covered according to an example embodiment.

FIG. 1 is a block diagram illustration of a screen 100 illustrating data generated from an application that contains sensitive information. Sensitive information may be information that a user of a device may not want others to be able to see. In one embodiment, the screen 100 may be the screen of a tablet type of device running a human resources application. In the example screen 100, a left portion 110 of the display includes a list of employees. A right portion 115 of the screen 100 includes sensitive information about an employee selected from the list. In this embodiment, some of the information, such as information related to compensation, including salary, pension, and stock information indicated at 120 is thought to be sensitive. General information about the selected employee indicated at 125 is not deemed sensitive.

Figure 2:
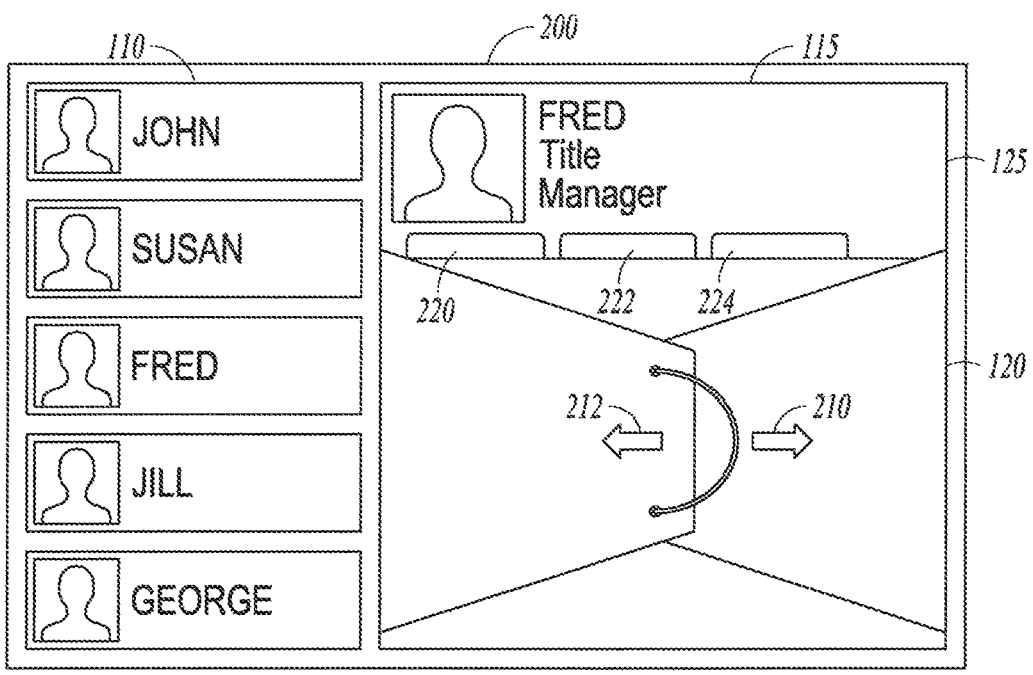
FIG. 2 is a representation of a screen displaying information containing sensitive information that is covered according to an example embodiment.

In one embodiment, the screen 100 may optionally include one or more icons 130, 132, that when selected by a user cause the sensitive information to be obscured. In FIG. 1, the icons are shown as two arrows 130, 132 that suggest that a pinching motion will cause a cover to appear, that obscures the sensitive information 120 as illustrated in FIG. 2 with covers 210 and 212. The arrows 130, 132 in one embodiment are simply informative coaching marks, to suggest to a user that a pinching motion in the sensitive information area 120 will cause a cover to appear to cover the sensitive information without minimizing a window. The arrows may occur initially when information about the employee is first displayed, and may be dismissed or simply stop appearing.

In a further embodiment, the cover may be briefly displayed in an animated manner to inform a user of their availability. In still further embodiments, the cover may be already in place to obscure the information as each employee is selected from the list 110. It may then be removed such as by a reverse pinching motion on a touch screen. The cover may simply remain in place as different employees are selected, or may appear automatically as each employee is selected so sensitive information is not mistakenly shared with other viewers of the display.

Further embodiments may include an actual selectable icon that invoke and remove the cover by selecting the icon by touching, mouse pad, or other input device. Hotkeys may be provided to invoke and revoke a cover. While the cover is shown as imitating a typical pair of window shutter like graphics, the cover in further embodiments may simply cover only the sensitive information in a particular portion or portions of the display, like a piece of paper with holes in it to be placed over the display and only allow viewing of selected information that is not deemed confidential or personal. Thus, the size and shape of the cover may be selected based on the application and what is deemed to be sensitive information.

In some embodiments, the visual design of the cover and invocation of the cover by the pinching motion may have a skeumorphic look and feel, borrowing from real world elements that have the same behavior on the touch screen as they would have in the real world. The interaction of pinching in the cover is appealing to the user due to an ease of grabbing and a realistic animation of the closing. A subtle closing sound may be used to support the appeal of the closing the cover. In further embodiments, a rectangle or other shape may be used to cover sensitive information.

In further embodiments, information may appear on the cover when the cover is used to cover sensitive information. A word, such as "CLOSED" may appear. Since the information being covered is not visible, there is room for instructions on the cover regarding how to open the cover, which may also be included in further embodiments, as well as an icon to select to open the cover.

In one embodiment, the cover is a user interface object that may be overlaid on the display generated by the underlying application. The interface object may be integrated into the application, with the covers designed by the application programmer, or may be added on top of the application by users of the application, obtaining context information from the application to identify where to place the covers to allow users to dynamically invoke the covers to cover sensitive information.

Also shown in FIG. 2 are one or more tabs 220, 222, 224 in the information window 115. In the example, a compensation tab has been selected, resulting in sensitive compensation information being displayed. Other tabs may or may not include sensitive information, and the cover can remain in place as different tabs are selected, or the cover's appearance may be tied to one or more tabs as desired depending on whether the tab would result in display of sensitive information.

Figure 3:
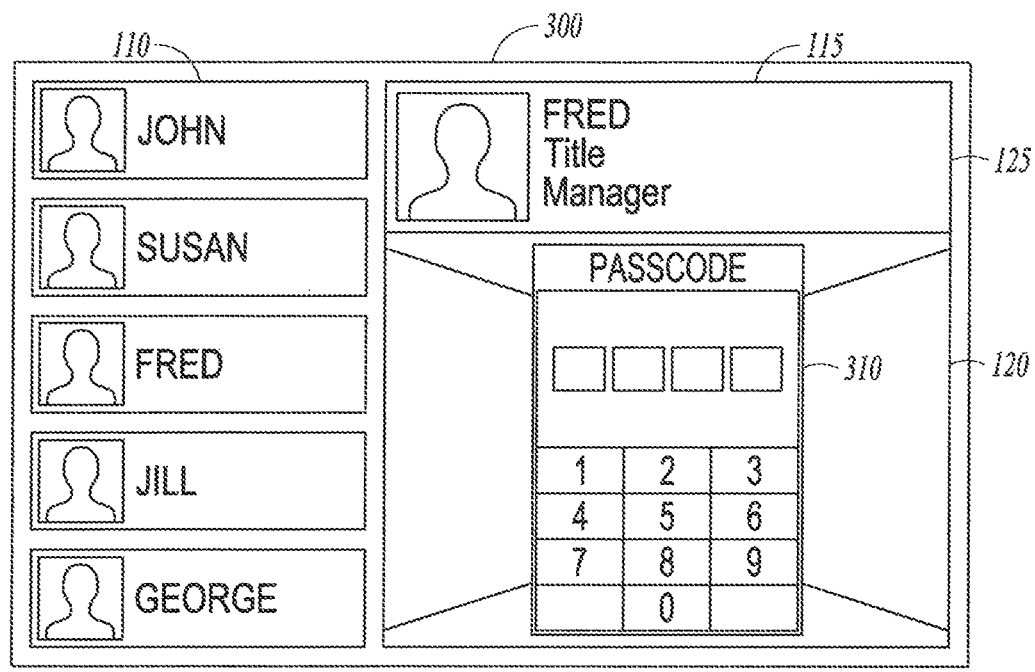
FIG. 3 is a representation of a screen displaying information containing sensitive that is covered, along with a code entry pad according to an example embodiment.

FIG. 3 is a representation of a screen 300 that includes a passcode entry user interface element 310. It may appear the first time a cover is invoked, allowing the user to select a passcode (password) that may be required to reopen the cover and view the sensitive information being covered. Element 310 may be dismissed without entry of a password to allow the user to simply uncover the sensitive information without a passcode, or if a passcode is entered, the element 310 will remain on the cover, or appear when the user attempts to remove the cover. The user will then be required to enter a passcode to remove the cover. The password in one embodiment is four digits in one embodiment, and may be more or fewer digits in further embodiments.

Figure 4:
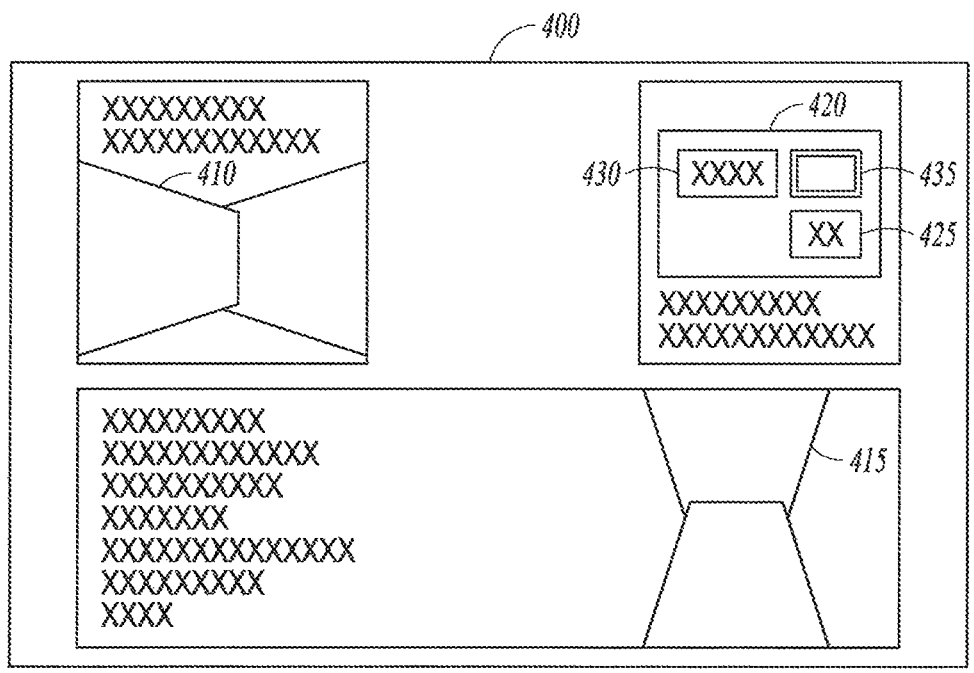
FIG. 4 is a representation of a screen displaying information containing sensitive information to be selectively covered by multiple covers according to an example embodiment.

FIG. 4 illustrates a screen representation 400 having multiple covers indicated over different portions of the screen at 410, 415, and 420. Cover 410 is used to cover sensitive information in one window as illustrated above. Cover 415 covers sensitive information in a further portion of the screen 400, and is illustrated covering in a vertical orientation as opposed to the horizontal orientation of cover 410. Cover 420 is illustrated as a simple one piece cover with openings 425, 430 to allow viewing of information under the cover that may be deemed not sensitive. Cover 420 is also illustrated with an icon 435, the selection of which removes the cover. Cover 420 may optionally be invoked and removed via pinching motions.

Figure 5A:
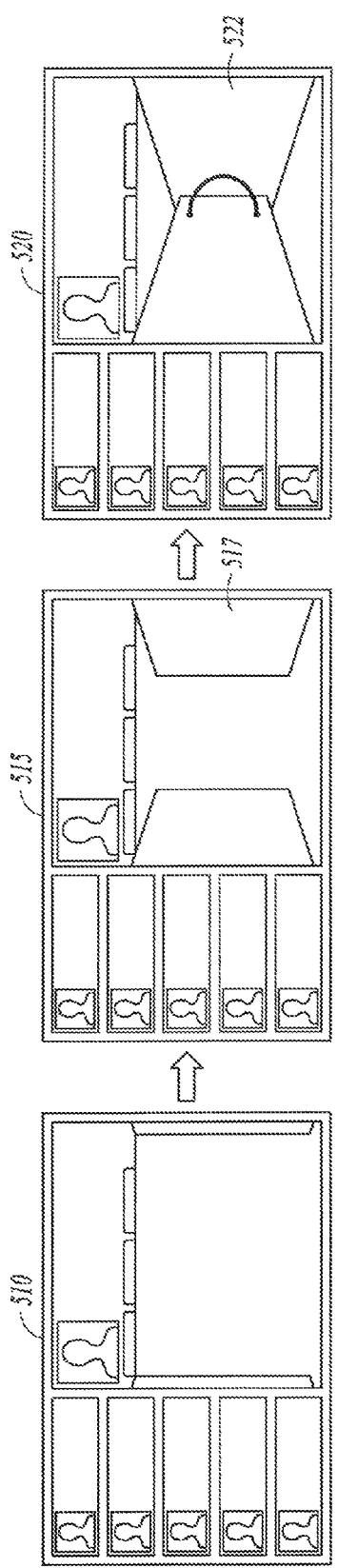
FIG. 5A is a representation of a series of screens displaying information containing sensitive information in the process of being selectively covered according to an example embodiment.
Figure 5B:
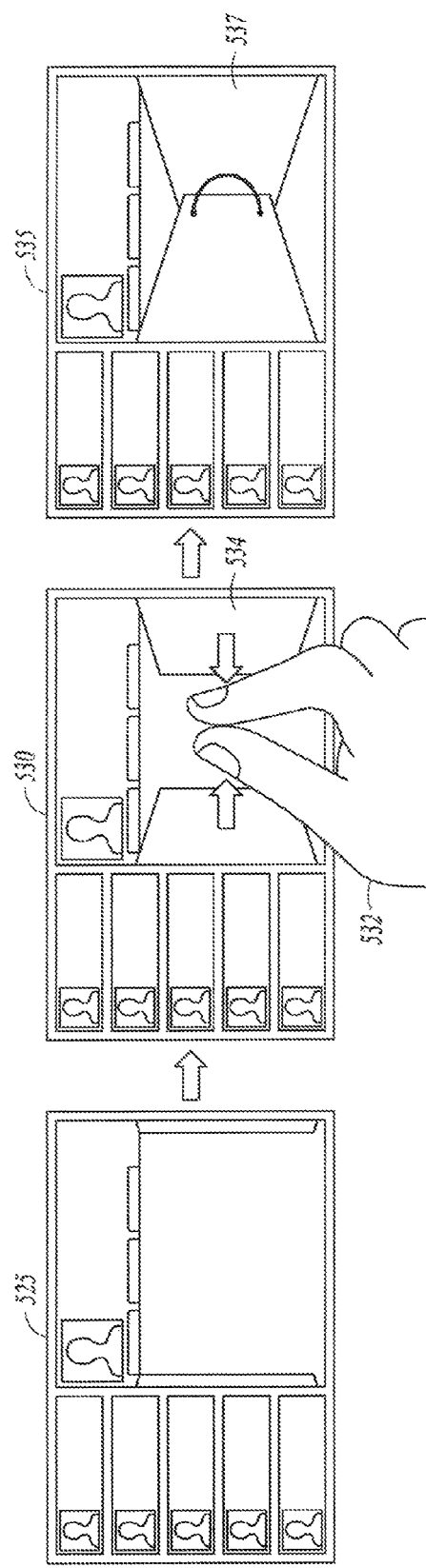
FIG. 5B is a representation of a series of screens displaying information containing sensitive information in the process of being selectively covered according to an example embodiment.
Figure 5C:
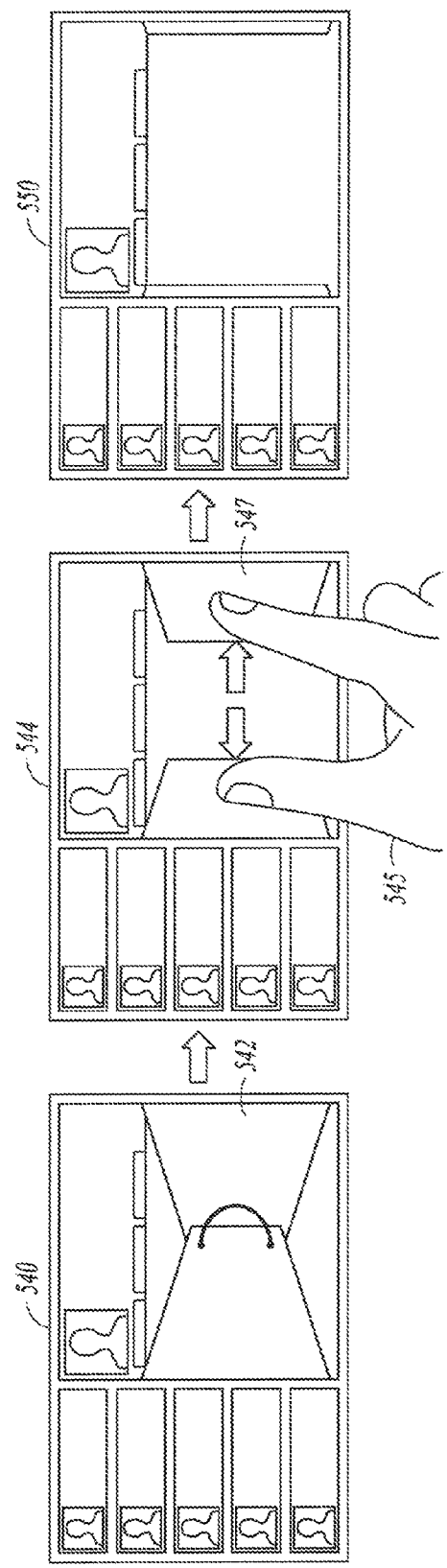
FIG. 5C is a representation of a series of screens displaying information containing sensitive information in the process of being selectively uncovered according to an example embodiment.

FIGS. 5A, 5B, and 5C illustrate sequences of screens as covers are opened and closed. In FIG. 5A, a screen 510 is shown with sensitive information being displayed. At 515, the screen is shown with a cover 517 partially closed, and at screen 520, a cover 522 is fully closed. The sequence illustrates the natural look and feel of a real world file being closed with flaps that are tied shut.

In FIG. 5B, a sequence illustrates an open screen 525 followed by a screen 530 where a user hand 532 is pinching shut a cover 534, which is shown partially closed. The pinching motion is illustrated as a user's hand bringing two separated fingers together. At screen 535, the cover is closed at 537.

In FIG. 5C, a sequence illustrates a screen 540 with a closed cover 542. At screen 544, a hand 545 is shown pinching open the cover using a reverse pinching motion, which is shown in a partially open position at 547. The user's fingers are moved apart to accomplish the reverse pinching motion. At screen 550, the cover is completely open, revealing the sensitive information.

Figure 6:
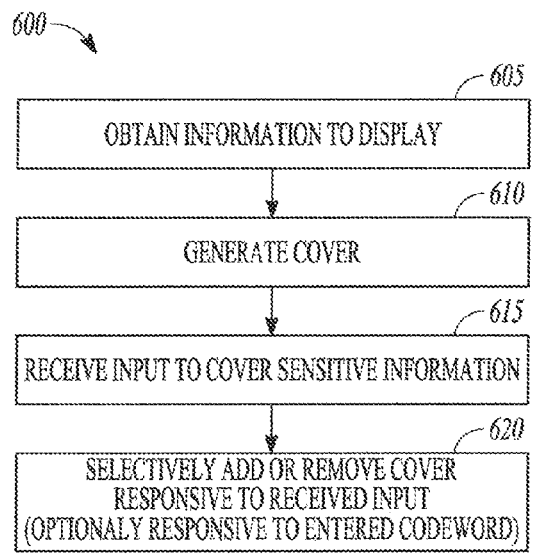
FIG. 6 is a flow diagram illustrating a method of displaying information and selectively covering and uncovering sensitive information according to an example embodiment.

FIG. 6 is a flow diagram illustrating a method 600 of displaying information and selectively covering and uncovering sensitive information. At 605, information to display is received. The information may be generated on a standalone device running an application, or may be received from a server running an application or other programming, such as a database interfacing with an app running on the display device. In various embodiments, the display device may be a tablet type device having a touchscreen, or may be a portable computer with a display device that is observable to the user and to others who may not be authorized to view the sensitive information.

A cover is generated at 610. The cover may be generated via a module running on the server, and preprogrammed to cover known sensitive information by programmers writing an application running on the server. In further embodiments, the cover may be running on either the server or a local computer displaying the information, and may be positionable by a user of the local computer where the user has knowledge of where sensitive information will be displayed when switching between different subjects, such as different employees. The cover may be modifiable by the user in terms of size and location in some embodiment by simply grabbing corners to enlarge or decrease the size, and may be dragged in further embodiments to desired locations.

At 615, input is received, such as by a user performing the pinching motions, or as directed by a default selection. The input is used to selectively add or remove the cover at 620. The input may include a passcode that may be entered by the user when initially covering the sensitive material and also when attempting to remove a cover that has already been passcode protected.

Figure 7:
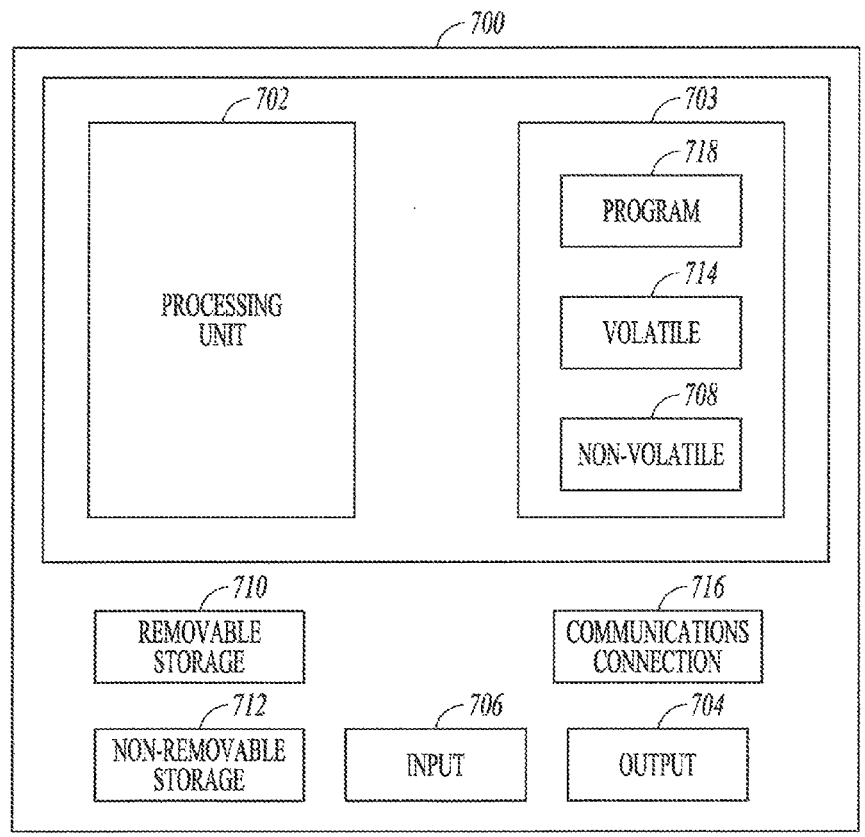
FIG. 7 is a block diagram illustrating a computer system for performing on or more methods according to example embodiments.

FIG. 7 is a block schematic diagram of a computer system 700 to implement a controller according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 700, may include a processing unit 702, memory 703, removable storage 710, and non-removable storage 712. Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 700 may include or have access to a computing environment that includes input 706, output 704, and a communication connection 716. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 702 of the computer 700. A hard drive, CD-ROM, and RAM are some examples of articles including a non-transitory computer-readable medium. For example, a computer program 718 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 700 to provide generic access controls in a COM based computer network system having multiple users and servers.

EXAMPLES

1. A method comprising:
    obtaining information from an application to display to a user of a device having a screen from which information may be viewed by more than one person;
    generating a cover to selectively obscure sensitive information contained in a portion of the screen displaying the information; and
    receiving user input to selectively invoke or remove the cover relative to sensitive information to obscure display of the sensitive information on the screen.

2. The method of example 1 and further comprising:
    generating a list of subjects for display;
    receiving a selection of a subject from a user; and
    retrieving sensitive information for the selected subject for display in the portion of the screen.

3. The method of example 2 wherein the cover is invoked to cover the portion of the screen containing sensitive information as each subject is selected.

4. The method of any of examples 1-3 and further comprising:
    generating a passcode entry pad for display when received user input selects to remove the cover;
    receiving a user entered passcode via the entry pad;
    comparing the received user entered passcode to a previously selected passcode; and
    removing the cover if the passcodes match.

5. The method of any of examples 1-4 wherein the screen comprises a touchscreen of a touchpad.

6. The method of example 5 wherein user input to selectively invoke or remove the cover comprises a pinching and reverse pinching touches on the touchscreen.

7. The method of any of examples 1-6 and further comprising generating an additional cover to selectively cover a further portion of the screen displaying the information.

8. The method of example 7 wherein the cover and the additional cover are independently controllable.

9. A system comprising:
    a processor;
    a computer readable storage device coupled to provide code to the processor;
    an application stored on the computer readable storage device to generate information for display on a display device, the information including sensitive information to be positioned in a selected portion of the display device;
    a cover module stored on the computer readable storage device to generate and control a cover positioned in the selected portion of the screen to selectively obscure the sensitive information.

10. The system of example 9 wherein the system comprises a touchpad device.

11. The system of any of examples 9-10 wherein the system comprises a server.

12. The system of example 11 wherein the system includes a touchpad device coupled to receive information from the server and display the information and the cover.

13. The system of example 12 wherein the touchpad is configured to receive user input to selectively invoke and remove the cover.

14. The system of example 13 wherein the user input comprises pinching and reverse pinching motions.

15. The system of any of examples 9-14 and further comprising a security module stored on the computer readable storage device.

16. The system of example 15 wherein the security module generates a user interface number pad to facilitate entry of a passcode.

17. The system of example 16 wherein a cover is removed when a user enters a passcode on the number pad.

18. The system of any of examples 9-17 wherein the cover module controls the cover as a function of user input to cover or reveal the sensitive information.

19. The system of any of examples 9-18 wherein the application is configured to call the cover module for selected portions of the display device.

20. A computer readable storage device having instructions to cause a computer to perform a method, the method comprising:
obtaining information from an application to display to a user of a device having a screen from which information may be viewed by more than one person;
generating a cover to selectively obscure sensitive information contained in a portion of the screen displaying the information; and
receiving user input to selectively invoke or remove the cover relative to sensitive information to obscure display of the sensitive information on the screen.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
obtaining information from an application to display to a user of a device having a screen from which information is viewable by more than one person;
generating a cover for a portion of the screen to selectively obscure sensitive information placed in the portion of the screen by the application, wherein the cover is a user interface object addable on top of the application and that is positionable and sizeable by user interaction via the user interface object to cover a desired portion of the screen; and
receiving user input to selectively invoke or remove the cover relative to the portion of the screen to obscure display of the sensitive information on the screen placed in the portion of the screen by the application.

2. The method of claim 1 and further comprising:
generating a list of subjects for display;
receiving a selection of a subject from a user; and
retrieving sensitive information for the selected subject for display in the portion of the screen.

3. The method of claim 2 wherein the cover is invoked separate from the application, to cover the portion of the screen containing sensitive information as each subject is selected, and wherein the cover is a user interface object that is positionable by a user to cover the portion of the screen where sensitive information will be placed by the application.

4. The method of claim 1 and further comprising:
generating a passcode entry pad for display when received user input selects to remove the cover;
receiving a user entered passcode via the entry pad;
comparing the received user entered passcode to a previously selected passcode; and
removing the cover if the passcodes match.

5. The method of claim 1 wherein the screen comprises a touchscreen of a touchpad.

6. The method of claim 5 wherein user input to selectively invoke or remove the cover comprises a pinching and reverse pinching touches on the touchscreen.

7. The method of claim 1 and further comprising generating an additional cover to selectively cover a further portion of the screen where sensitive information is to be displayed by the application prior to identification of the sensitive information.

8. The method of claim 7 wherein the cover and the additional cover are independently controllable.

9. A system comprising:
a processor;
a computer readable storage device coupled to provide code to the processor;
an application stored on the computer readable storage device to generate information for display on a display device, the information including sensitive information to be positioned in a selected portion of the display device;
a cover module stored on the computer readable storage device to generate and control a cover positioned in the selected portion of the screen to selectively obscure the sensitive information, wherein the cover is a user interface object addable on top of the application and that is positionable and sizeable by user interaction via the user interface object to cover a desired portion of the screen.

10. The system of claim 9 wherein the system comprises a touchpad device.

11. The system of claim 9 wherein the system comprises a server.

12. The system of claim 11 wherein the system includes a touchpad device coupled to receive information from the server and display the information and the cover.

13. The system of claim 12 wherein the touchpad is configured to receive user input to selectively invoke and remove the cover wherein the cover a user interface object that is positionable by a user to cover the portion of the screen where sensitive information will be placed by the application.

14. The system of claim 13 wherein the user input comprises pinching and reverse pinching motions.

15. The system of claim 9 and further comprising a security module stored on the computer readable storage device.

16. The system of claim 15 wherein the security module generates a user interface number pad to facilitate entry of a passcode.

17. The system of claim 16 wherein a cover is removed when a user enters a passcode on the number pad.

18. The system of claim 9 wherein the cover module controls the cover as a function of user input to cover or reveal the sensitive information.

19. The system of claim 9 wherein the application is configured to call the cover module for selected portions of the display device.

20. A computer readable storage device having instructions to cause a computer to perform a method, the method comprising:
obtaining information from an application to display to a user of a device having a screen from which information is viewable by more than one person;
generating a cover for a portion of the screen to selectively obscure sensitive information placed in the portion of the screen by the application; and
receiving user input to selectively invoke or remove the cover relative to the portion of the screen to obscure display of the sensitive information on the screen, wherein the cover is a user interface object addable on top of the application and that is positionable and sizeable by user interaction via the user interface object to cover a desired portion of the screen.

\* \* \* \* \*